United States Patent [19]

Sederquist

[11] Patent Number: 4,766,044
[45] Date of Patent: Aug. 23, 1988

[54] FUEL CELL RECYCLING SYSTEM

[75] Inventor: Richard A. Sederquist, Newington, Conn.

[73] Assignee: International Fuel Cells Corporation, South Windsor, Conn.

[21] Appl. No.: 926,297

[22] Filed: Nov. 3, 1986

[51] Int. Cl.[4] .............................................. H01M 8/18
[52] U.S. Cl. ....................................... 429/19; 429/13; 429/17
[58] Field of Search ............................. 429/17, 19, 13

[56] References Cited

U.S. PATENT DOCUMENTS 3,553,026  1/1971  Winsel ..................................... 429/13
4,532,192  7/1985  Baker et al. ......................... 429/17 X
4,539,267  9/1985  Sederquist ......................... 429/19 X
4,642,272  2/1987  Sederquist ......................... 429/19 X
4,657,829  4/1987  McElroy et al. ...................... 429/19

Primary Examiner—Brian E. Hearn
Assistant Examiner—Stephen J. Kalafut
Attorney, Agent, or Firm—Lloyd D. Doigan

[57] ABSTRACT

A fuel cell power plant recycles a first portion of the exhaust of a main stack within the main stack and utilizes a second portion of the exhaust to provide fuel to a vent stack. The ratio of fuel cells between the main stack and the vent stack is greater than 3:1 and is preferably 9:1.

6 Claims, 2 Drawing Sheets

FUEL CELL RECYCLING SYSTEM

DESCRIPTION

1. Technical Field

This invention relates to fuel cells and more particularly to a method and apparatus to increase the consumption of fuel used therein.

2. Background Art

In order to produce commerically viable amounts of electricity from fuel cells, the cells must utilize their fuel (generally hydrogen) as efficiently as possible. Ideally, a fuel cell stack would convert all the hydrogen fed thereto into electricity. However, there are several constraints to this goal. It has been found that a fuel cell stack should consume approximately 66% of the fuel, which generally contains a mixture of from 50%-75% hydrogen with the balance comprising inert gases such as carbon dioxide and water, passing through the stack at any one time (i.e. per pass). If a fuel cell stack consumes more than approximately 66% of the hydrogen, there arises a danger of starvation within individual fuel cells due to the vagaries of the distribution of the hydrogen within the fuel cell stack. Some cells will receive an abundance of hydrogen to support the oxidation reaction experienced in fuel cells while others lack hydrogen to support the reaction (i.e., starve). The starved fuel cells may consume themselves or corrode thereby lowering the voltage or causing the failure of the entire stack.

Recycle systems are known to increase the overall utilization of hydrogen. Such systems recycle a percentage of the hydrogen exhausted from the stack for reuse therein. If it is desired that a fuel cell stack utilize 85% of the hydrogen input thereto while using less than 66% of the hydrogen per pass, the stack must recycle about 75% of the fuel cell stack exhaust. In other words, three times the amount of fuel finally exhausted from the stack is recycled. For example, a fuel cell stack is designed to utilize eighty-five moles of hydrogen per pass. One hundred moles of unrecycled hydrogen is fed to the stack along with forty-five moles of recycled hydrogen. The stack utilizes eighty-five moles and exhausts sixty moles of which, as noted above, 75% (forty-five moles) is recycled. Fifteen moles is exhausted. The overall utilization of hydrogen is equal to eighty-five moles of hydrogen used (one hundred moles fed minus fifteen moles exhausted) divided by the one hundred moles of fuel input or 85%. Since the fuel cell stack utilized eighty-five moles of the one hundred forty-five moles of hydrogen passing therethrough at any one time, the utilization of fuel per pass is equal to eighty-five moles divided by one hundred forty-five moles or about 59%. There is little danger of starving any of the cells because the cells only use 59% of the hydrogen flowing through the system at any time. There is more fuel in the cells than the cell can use so the danger of starvation is small.

In order to achieve higher overall utilizations, it is necessary to increase the amount of fuel recycled. For example, in order to utilize 95% of the hydrogen in a fuel cell stack without the threat of starvation, over 90% of the hydrogen exhausted must be recycled. In other words, nine times the amount of fuel finally exhausted from the stack is recycled. Higher utilization recycling systems have several problems. A powerful blower operating at high speeds is required to extract nine times the amount of fuel finally exhausted for recycling. The blower requires a great deal of parasitic power (i.e. supplied by the fuel cell) thereby decreasing the energy output from the fuel cell. Moreover, the partial pressure of the hydrogen for the entire system is lower due to the recycling of a large amount of low quality (i.e., low percentage of hydrogen) exhaust at the higher blower speeds necessary to extract 90% of the exhaust.

DISCLOSURE OF INVENTION

It is an object of the invention to utilize a very high percentage of the fuel used in a fuel cell stack without encountering starvation of the fuel cells, without voltage losses, and without high parasitic power requirements.

According to the invention, the exhaust of a first plurality of fuel cells, which includes unused fuel, has a portion directed back to the first plurality of fuel cells to utilize some of the unused fuel and has another portion directed to a second plurality of fuel cells to utilize some of the unused fuel therein.

According to an embodiment of the invention, the ratio between the number of cells within the first plurality of fuel cells to the second plurality of fuel cells is greater than 3:1 and is preferably 9:1.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 1:
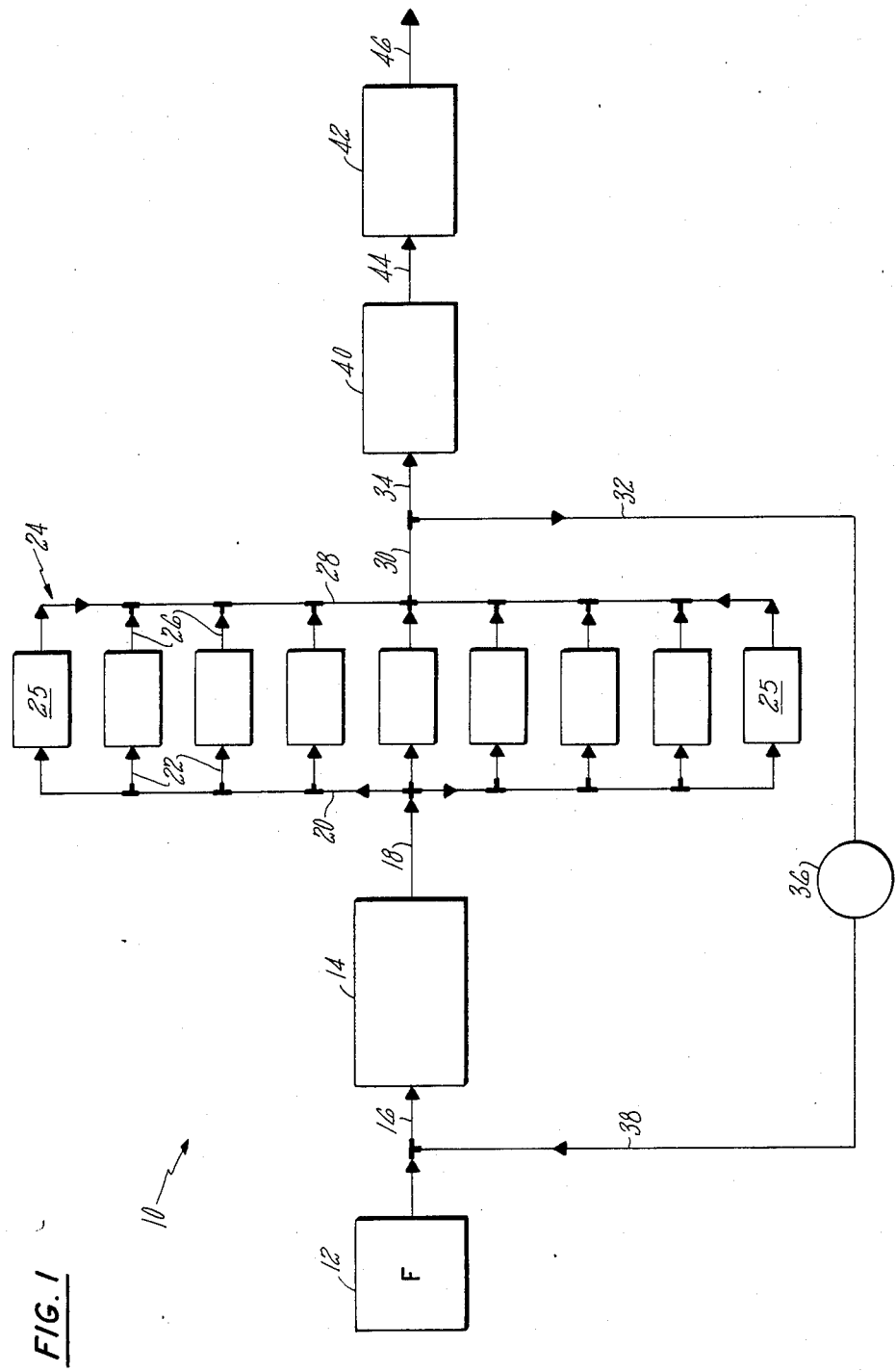
FIG. 1 is a block diagram showing a preferred embodiment of a fuel cell recycling system for a fuel cell powerplant in accordance with this invention.

Referring to FIG. 1, there is shown a block diagram of a fuel recycling system 10 for use within a fuel cell powerplant which operates in accordance with the teachings of this invention. A raw fuel supply 12 is connected to a first fuel converter comprising a reformer and a shift reactor shown schematically as block 14 via line 16. The first fuel converter is connected via line 18 to an inlet manifold 20. The inlet manifold branches into nine separate lines 22 each line 22 connecting to a fuel cell 25 within a main fuel cell stack 24. Each fuel cell 25 is connected by a line 26 to an exhaust manifold 28. The exhaust manifold 28 is in turn connected to line 30. Line 30 branchs into a recycle line 32 and to a vent stack line 34. The recycle line is attached to a blower 36 which in turn is attached to line 16 by line 38. A vent stack line 34 attaches to a second fuel converter comprising a reformer and a shift reactor shown schematically as block 40 and which is attached to a vent stack 42 via line 44. The vent stack 42 is another fuel cell as will be discussed infra. The nine fuel cells in the main stack and the one fuel cell in the vent stack are connected electrically in series (not shown) such that each cell of the ten total cells utilizes one-tenth of the hydrogen input thereto. An exhaust line 46 carries the exhaust of the vent stack outside the system.

In operation raw fuel, such as methane, is input to the first fuel converter to convert the methane into hydrogen for use by the main fuel cell stack 24. In the reformer, the methane is reacted with steam in the presence of heat and a catalyst to form carbon dioxide, carbon monoxide, and hydrogen. Some methane and steam is not reacted. The shift reactor converts most of the remaining carbon monoxide to carbon monoxide and hydrogen so that the mixture fed to the stack via line 18 comprises a given percentage of carbon dioxide, hydrogen, methane and steam. This mixture of hydrogen and unreacted methane and steam is fed to the main stack 24 of nine fuel cells 25 via line 18, inlet manifold 20 and lines 22 for in use each cell. The exhaust of the fuel cells passes through lines 26 to the exhaust manifold 28 and line 30. A percentage of the exhaust is drawn through line 32 by the blower 36 and impelled back to line 16 for reuse within the system via line 38. The percentage of the exhaust not drawn through line 32 travels to the second converter 40 to convert the unreacted methane and steam into hydrogen for use in the vent stack via line 34. The output of the second converter passes via line 44 to the vent stack 42. The exhaust of the vent stack is then output from the system via line 46.

Such a system is designed to use 95% of the hydrogen input thereto from the fuel supply as follows. For example, the main stack 24 is designed to use eighty-five and one-half moles of hydrogen for each pass therethrough. The fuel supply feeds raw fuel to the first converter 14 wherein one hundred moles of hydrogen are formed to be fed to the main stack. The recycle line directs twenty-nine moles of hydrogen from the main stack exhaust back to the main stack. At any time, therefore, one hundred twenty-nine moles of hydrogen are being fed to the main stack. Because the main stack uses eighty-five and one-half moles of the one hundred twenty-nine moles of hydrogen available, forty-three and one-half moles (one hundred twenty-nine moles minus eighty-five and one-half moles) are exhausted from the main stack. As noted above, twenty-nine of those moles are recycled and fourteen and one-half moles go to the vent stack 42. The vent stack uses nine and one-half moles of hydrogen and five moles of hydrogen exit the system via the exhaust line. For every one hundred moles of fuel fed to the system, five moles are exhausted from the system. The system utilization rate is therefore 95%. In the main stack, eighty-five and one-half moles of the one hundred twenty-nine moles fed thereto are consumed for each pass. The utilization rate for each pass is therefore eighty-five and one-half moles divided by one hundred twenty-nine moles or 66%. There is little danger of any fuel cell being starved as there is plenty of hydrogen to support the oxidation reaction in each cell. Similarly, the vent stack uses nine and one-half moles of the fourteen and one-half moles of hydrogen input thereto. The utilization rate per pass of the vent stack is nine and one-half moles divided by fourteen and one-half moles for a 65% utilization rate per pass. Again, the probability of fuel starvation for the vent stack is very low. Since only twenty-nine of the forty-three and one-half moles are recycled (67% or, in other words, only two times the amount of fuel exhausted from the main stack), a smaller blower operating at lower speeds and power requirements may be used.

The ratio between the number of cells in the main stack and the number of cells in the vent stack depends generally on the desired overall utilization of hydrogen in the system. For instance, it is desired that 85% of the hydrogen be used, a ratio of approximately 3 to 1 is ideal. For utilization of 95% of the hydrogen be used, a ratio of 9 to 1, as shown, is desired.

As is well known in fuel cells, the net reaction is $H_2 + \frac{1}{2}O_2 \rightarrow H_2O + \text{current} + \text{heat}$. One can readily see that if more hydrogen is used, more current is produced. Similarly as power is equal to voltage times current, the increase in current increases power as well.

Figure 2:
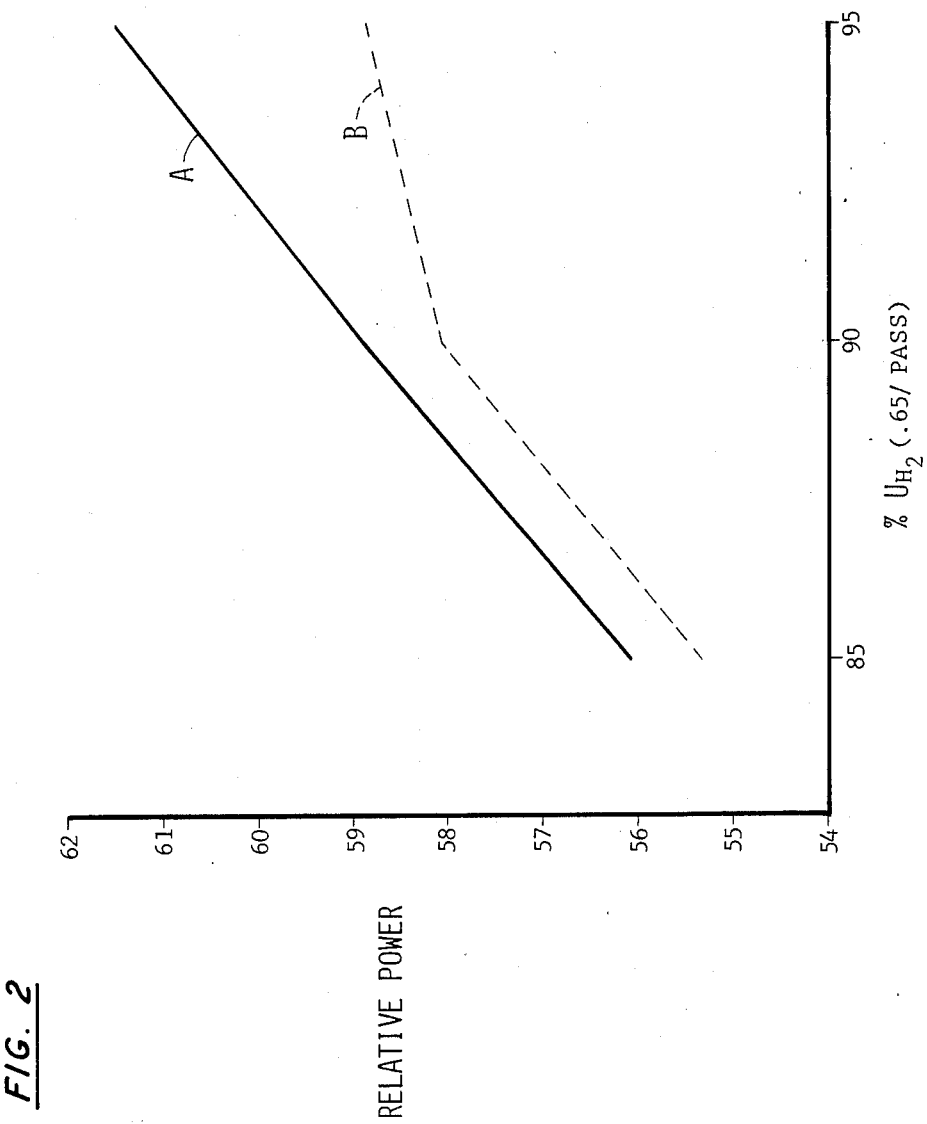
FIG. 2 is a graphic depiction of the advantages of the system of FIG. 1.

Referring to FIG. 2, one can readily see the advantage of the fuel cell recycling system of the invention over a typical recycle system. The graph shows the power output of two types of systems given a 65% utilization of hydrogen per pass for a certain percentage utilization of hydrogen ($UH_2$) by the overall system in a molten carbonate fuel cell. Line A shows the power output of a vent stack system. Line B shows the power output of a standard recycle system without a vent stack. At 95% utilization, it is noted that the vent stack system operates at about a 5% greater power output than the recycle system. The power drop-off in the recycle system at 95% is probably caused by voltage drops due to starvation within the cells of the recycle system.

The system is a large improvement over typical recycle systems in that the percentage of flow per pass remains at about optimum, there is less parasitic power demand because of the percentage of fuel recycled from the exhaust by a blower is relatively low, and the partial pressure of the hydrogen is relatively high within the fuel cells because the speed of the recycled exhaust is relatively low.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention. One of ordinary skill in the art will note that the fuel recycling system 10 may be comprised of a plurality of cells in a single stack. Additionally, the system 10 may be comprised of a plurality of stacks as opposed to the plurality of cells as shown in FIG. 1. Moreover, if the raw fuel fed to the system is hydrogen, the first and second converters 14, 40 may not be necessary.

I claim:

1. A fuel cell recycling system comprising:
   a first plurality of fuel cells being adapted to electrochemically convert fuel into electricity and exhaust;
   a second plurality of fuel cells being adapted to electrochemically convert fuel into electricity and exhaust;
   feed means for supplying fuel to said first plurality of fuel cells in parallel;
   exhaust means for receiving exhaust from said first plurality of fuel cells;
   recycling means for directing a first portion of the exhaust of said first plurality of fuel cells from said exhaust means to said feed means to recycle said exhaust from said first plurality of fuel cells in said first plurality of fuel cells;
   vent means for directing a second portion of said exhaust from said exhaust means to said second plurality of fuel cells in parallel; and
   means for electrically connecting said first plurality of fuel cells and said second plurality of fuel cells in series such that said first plurality of fuel cells and said second plurality of fuel cells utilize equal proportions of said fuel.

2. The fuel cell recycling system of claim 1, wherein a ratio of a number of cells in the first plurality of fuel cells to a number of cells in the second plurality of fuel cells is greater than 3:1.

3. The fuel cell recycling system of claim 2 wherein said ratio is 9:1.

4. The fuel cell recycling system of claim 1, wherein said vent means includes a converter means for converting a percentage of said second portion of said exhaust into fuel.

5. Method of increasing the utilization of fuel within a fuel cell power plant comprising the steps of:

feeding fuel in parallel to a first plurality of fuel cells wherein said fuel is converted to electricity and exhaust;
collecting said exhaust of said first plurality of fuel cells;
feeding a first portion of said exhaust back into said first plurality of fuel cells;
feeding a second portion of said exhaust in parallel to a second plurality of fuel cells; and
collecting current from said first plurality of fuel cells and said second plurality of fuel cells all of said fuel cells being connected electrically in series such that each cell utilizes the same proportion of fuel.

6. Method of claim 5 further comprising:
converting a percentage of said second portion of said exhaust into fuel before feeding said second portion into said second plurality of fuel cells.

* * * * *